July 16, 1968    A. D'APERY MILLS    3,392,839
MULTIPLE ELEMENT STRAINER SANDWICH
Filed Sept. 27, 1965

INVENTOR.
Allen d'Apery Mills
BY
ATTORNEYS

United States Patent Office 3,392,839
Patented July 16, 1968

3,392,839
MULTIPLE ELEMENT STRAINER SANDWICH
Allen d'Apery Mills, Lansdale, Pa., assignor to Andale Company, Lansdale, Pa., a corporation of Pennsylvania
Filed Sept. 27, 1965, Ser. No. 490,343
3 Claims. (Cl. 210—295)

ABSTRACT OF THE DISCLOSURE

A strainer sandwich adapted for use in strainer apparatus having provision for backwashing, the strainer sandwich being made up of a fine mesh element, such as a screen, having upstream and downstream grids associated therewith, the upstream grid having relatively small apertures therethrough to provide extensive support for the fine mesh element during backwashing under high pressure, and the upstream grid being constructed to provide apertures having greater flow length than cross section.

---

This invention relates to straining apparatus and is particularly concerned with a multiple element strainer sandwich adapted for use in straining apparatus in which the strainer itself is subjected to flow of the liquid to be strained in one direction, and in which provision is made for backflow or backwashing of the strainer element with a washing liquid passed through the strainer in the direction opposite to the normal flow.

The invention, moreover, is especially concerned with strainers adapted for use where the impurities or other materials to be separated comprise fibrous debris or other materials such as paper pulp, hair, synthetic fibers, and natural organic matter.

One of the principal objects of the invention is to provide a strainer device or assembly adapted for use in apparatus of the kind referred to, the strainer assembly of the invention incorporating an element of fine mesh in order to provide for separation of particles of small size, the device further incorporating additional strainer elements so arranged and constructed as to contribute substantial structural strength to the fine mesh straining element, while at the same time preventing excessive buildup of fibrous material on the fine mesh element and within the apertures or perforations of the fine mesh element.

In further explanation of the foregoing, it is pointed out that in equipment employing a fine mesh strainer element, for instance, a fine mesh screen made for example of woven wire, there is a tendency for fibrous debris or fibrous materials to become entangled with the wire of which the fine mesh element is woven. When this occurs it becomes very difficult for the backwash liquid to dislodge the entangled fibers, with the result that more frequent shutdowns and replacements of strainer elements are needed. According to the present invention this difficulty is largely overcome by use of the fine mesh strainer element in combination with certain other elements in the form of honeycomb grids, the action of which prevents excessive entanglement and build-up of fibers in and on the fine mesh element, this action being explained more fully hereinafter following the description of the preferred embodiment of the apparatus.

In addition to the foregoing, the employment of honeycomb elements in combination with the fine mesh screen (the screen preferably constituting an intermediate element of a sandwich group in which the upstream and downstream elements comprise honeycomb grids) has the further advantage of reinforcing or providing support for the fine mesh screen, particularly during the backwash operation. Because of this support or bracing, it is practical to employ higher pressures and velocities in the backwash operation thereby facilitating the elimination of whatever fibrous material tends to accumulate on the fine mesh screen. With this factor in mind the invention also contemplates employment of a honeycomb grid at the upstream side of the strainer sandwich having apertures of smaller size than the apertures of the honeycomb grid at the downstream side of the sandwich.

How the foregoing objects and advantages are attained will be clear from the following description of the accompanying drawing illustrating the preferred embodiment of the invention, in which.

Figure 1:
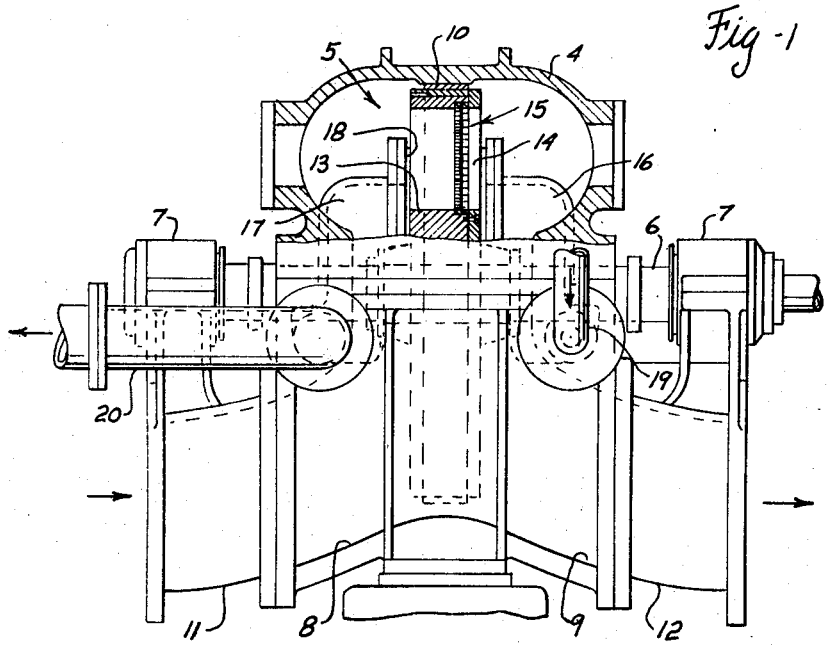
FIGURE 1 is an elevational view, with parts in vertical section, of a rotary strainer of a type with which the strainer sandwich of the invention is adapted to be used.

Although the strainer sandwich of the present invention is adapted for use in straining apparatus of various kinds, including basket type strainers having a plurality of strainer baskets which are alternatively brought into the flow line, provision being made for backwashing the basket which is not in use, for purposes of illustration, the strainer sandwich of the invention is herein shown and described as applied to a rotary strainer, the general arrangement of which appears in FIGURE 1. As there shown, the apparatus includes casing 4 in which the strainer wheel generally indicated at 5 (see also FIGURE 2) is mounted by means of a shaft 6 projecting externally of the casing at both sides of the rotor 5 and mounted by means of bearing blocks 7—7.

The strainer wheel 5 lies in a plane dividing the casing 4 into inlet and outlet chambers 8 and 9, respectively, and the periphery of the strainer wheel is provided with a seal or packing such as indicated at 10 in order to prevent short-circuiting of the liquid by leakage around the edge of the wheel. Liquid to be strained is introduced at the inlet side by means of the inlet connection 11, the direction of inflow being indicated by an arrow at the left of FIGURE 1. Similarly, discharge of the strained liquid after passing through the strainer wheel is effected through a discharge connection 12 in the direction indicated by the arrow at the right of FIGURE 1.

The foregoing type of straining apparatus is also disclosed in McNeal Patent 2,057,497 issued Oct. 13, 1936, and the details of the construction of the rotary strainer need not be considered herein as they form no part of the present invention per se. However, it is to be noted that the strainer wheel comprises two spoked parts 13 and 14, the parts 13 constituting the principal part of the strainer wheel which is mounted on the shaft 6, and both parts have peripheral rings adjacent to the surrounding casing wall. The strainer sandwich, generally indicated at 15 is disposed and supported between the spoked parts 13 and 14.

The axial dimension of the spokes of the wheel part 13 is relatively large in order to provide strainer pockets of considerable volume at the input or upstream side of the strainer sandwich. This is useful in providing adequate volume to handle substantial quantities of debris or other materials being strained from the liquid.

The cleaning or backwashing of the strainer elements is accomplished in the equipment illustrated by employment of inlet and outlet wash water boxes 16 and 17 positioned respectively at the downstream and upstream sides of the strainer wheel. Each of these boxes is provided with an apertured side or face adjacent to the strainer wheel, preferably with an interposed sealing piece such as shown at 18 in order to provide a watertight seal between the wash water box and the side face of the wheel. During rotation of the strainer wheel, the strainer pockets between the spokes of the wheel are brought sequentially into a position between the wash boxes 16 and 17 so that the washing liquid, usually water, entering through the connection 19 may pass from the box 16 through the strainer elements, thereby dislodging the debris or other material being strained from the strainer pockets and carrying this material into the outlet box 17 and thence to a point of disposal through the connection 20. Further details of wash boxes and a back-washing arrangement of the general type just described may be found in the issued patent fully identified above.

Figures 2, 3:
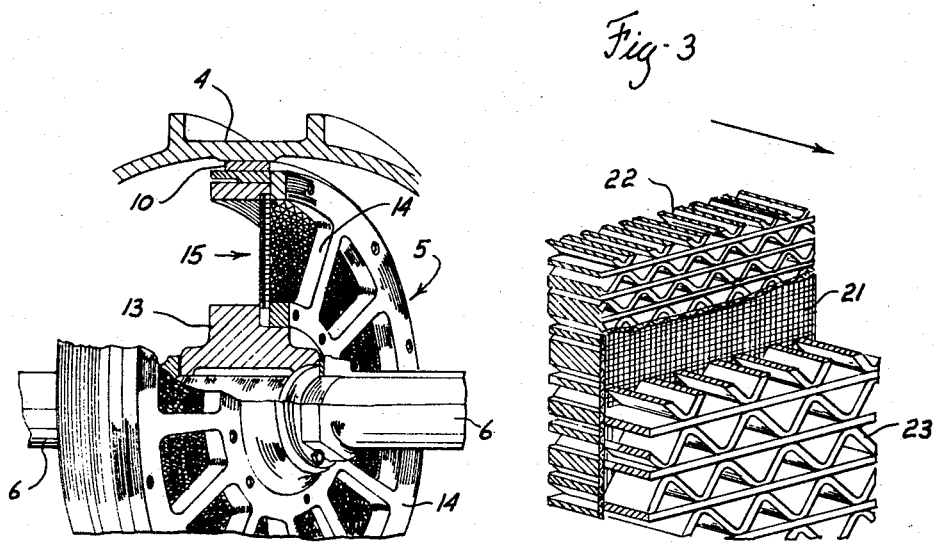
FIGURE 2 is an isometric fragmentary view of a portion of the strainer wheel of the apparatus of FIGURE 1, with parts broken out and shown in section, this view being on a slightly enlarged scale as compared with FIGURE 1.
FIGURE 3 is a greatly enlarged fragmentary view of portions of the several elements of a strainer sandwich made up in accordance with the present invention.

Turning now to the structure of the strainer sandwich provided in accordance with the present invention, particular attention is directed first to FIGURE 3. In that figure it will be seen that the strainer sandwich is made up of 3 strainer elements disposed in face to face relation. The intermediate element comprises a fine mesh screen such as indicated at 21, although this screen may merely comprise a plate or sheet with fine perforations therein. In a typical preferred embodiment the intermediate element comprises a woven wire screen of fine mesh, for instance of the order of 325 to 20 mesh, and preferably between about 80 mesh and 200 mesh.

The other elements of the sandwich comprise honeycomb grids 22-23 which may conveniently be made up of an assembly of metal strips, alternate ones of which are crimped. These strips may be stacked one upon another in parallel planes or a pair of strips (one flat and the other crimped) may be spirally wound layer upon layer to form an annulus to be clamped between the two spoked parts 13 and 14 of the strainer wheel. In the event of employment of the sandwich construction of the present invention in a strainer of different form than that illustrated, for instance, in a basket shaped strainer, the honeycomb grid elements may be assembled in other ways appropriate to the shape of the basket. In all cases, however, it is contemplated that the strainer sandwich comprise the intermediate fine mesh element, assembled with the upstream and downstream honeycomb grids. The several elements of the strainer may, if desired, be braced so as to consolidate the entire structure into a self-supporting unit, although it is also practical in some arrangements to rely upon the clamping action of external parts, such as the parts 13 and 14 of the strainer wheel for the purpose of maintaining the elements of the strainer sandwich in assembled relation.

In accordance with the preferred practice of the invention the upstream grid (22 as shown in FIGURE 3) is constructed to have apertures which have smaller cross-sectional flow area than the apertures in the downstream grid 23. The apertures in the upstream honeycomb grid are of substantially greater length than the cross-section thereof because this ratio between length and cross-section of the apertures enhances the action of the upstream grid 22 in shielding the intermediate fine mesh screen from excessive contact with fibrous debris. In a typical strainer sandwich according to the invention adapted for separation of debris incorporating fibrous constituents, the widths of the strips of which the honeycomb is composed, and thus the length of the apertures through the upstream grid, is of the order of from ⅛ inch to ⅜ inch.

The action of the upstream grid, especially when proportioned in the manner indicated, in reducing tendency for fibrous debris to clog the fine mesh screen, may be explained by pointing out that many individual fibers suspended in the liquid being strained will strike the upstream edges of the strips of the honeycomb 22 and will be caused to flex or bend over such edges, with the ends of the fibers projecting into the apertures of the honeycomb; but by making the length of the honeycomb passages of greater length than the cross-sectional flow area thereof, the fibers which straddle the individual strips of the honeycomb in the manner just referred to will not be of length such that the ends of those fibers would reach the fine mesh screen 21.

The fine mesh screen 21 is therefore not subject to excessive plugging action as a result of accumulation of fibrous debris. It is further here pointed out that upon backwashing, the fibrous debris accumulated on the upstream edges of the honeycomb grid 22, is much more readily dislodged and flushed away, than would be the case if those fibers accumulated on the fine mesh screen. Indeed the washing of fibrous debris from a fine mesh screen is particularly troublesome because of the fact that ends of fibers tend to project through the screen openings, and, upon application of the wash water those free ends of the fibers tend to be deflected around and over adjacent wires of the woven screen, thus interlocking the fibers with the screen.

The minimization of contact of fibrous debris with the fine mesh screen is therefore of great importance in straining equipment adapted to handle materials of this sort.

Finally it is also to be noted that the provision of an upstream grid 22 having smaller apertures than in the downstream grid 23 insures that the fine mesh screen 21 will have adequate backing and support during backwash, which is frequently effected under very high pressures and velocities. Indeed such pressures often exceed 100 lbs. per square inch and such velocities often exceed 100 feet per second, and in the absence of effective backing for the screen would easily rupture the screen. Thus the employment of the honeycomb grid type of element at the upstream side of the fine mesh screen is of importance not only in enhancing the straining action, but also in providing adequate reinforcement or support for the fine mesh screen.

I claim:
1. Apparatus for use in straining solid materials from a liquid comprising a casing having inlet and outlet connections for liquid to be strained, a strainer device in the casing in the path of liquid flow from the inlet to the outlet, said device being composed of upstream, downstream and intermediate elements, the intermediate element comprising a fine mesh screening and each of the other elements being of coarser mesh than the intermediate element, and the upstream element comprising a honeycomb grid formed of flat strips and having passages between the strips extended through the grid generally perpendicular to the plane of the intermediate element, the width of the strips and thus the length of the passages being substantially greater than the cross section of the passages, and strainer washing mechanism comprising inlet and outlet means for a liquid washing medium providing for reverse flow of the washing medium through the strainer device as compared with the flow during straining.

2. Apparatus for use in straining solid materials from a liquid comprising a casing having inlet and outlet connections for liquid to be strained, a strainer device in the casing in the path of liquid flow from the inlet to the outlet, said device being composed of upstream, downstream and intermediate elements stacked in face to face relation, the intermediate element comprising a fine mesh screening and each of the other elements being composed of an assembly of strips of width at least several times the thickness of the screening and positioned edgewise of the screening, at least some of the strips of each element being crimped and being assembled with other strips in positions providing apertures for liquid flow through the element, the upstream element having smaller apertures between the strips thereof than the apertures between the strips of the downstream element, and the strips of the upstream element being of width at least equal to the average cross-sectional dimension of the apertures therein, and strainer washing mechanism comprising inlet and outlet means for a liquid washing medium providing for reverse flow of the washing medium through the strainer device as compared with the flow during straining.

3. Apparatus for use in straining solid materials from a liquid comprising a casing having inlet and outlet connections for liquid to be strained, a strainer device in the casing in the path of liquid flow from the inlet to the outlet, said device being composed of upstream, downstream and intermediate elements stacked in face to face relation, the intermediate element comprising a fine mesh screening and each of the other elements comprising a honeycomb grid with elongated passages therethrough extended perpendicular to the plane of the fine mesh screening, and the upstream honeycomb grid having apertures of smaller cross-section than the apertures in the downstream grid, and strainer washing mechanism comprising inlet and outlet means for a liquid washing medium providing for reverse flow of the washing medium through the strainer device as compared with the flow during straining.

References Cited

UNITED STATES PATENTS

| | | | |
|---|---|---|---|
| 217,126 | 7/1879 | Loudon | 210—489 |
| 1,719,486 | 7/1929 | Pelzer | 210—489 X |
| 2,057,497 | 10/1936 | McNeal | 210—392 |
| 2,184,177 | 12/1939 | Burrell | 210—108 X |
| 2,382,656 | 8/1945 | Obenshain et al. | 210—392 X |
| 3,172,747 | 3/1965 | Nodolf | 55—387 |

FOREIGN PATENTS 241,173  3/1926  Great Britain.

SAMIH N. ZAHARNA, *Primary Examiner.*

REUBEN FRIEDMAN, *Examiner.*

D. M. RIESS, J. ADEE, *Assistant Examiners.*